United States Patent
Vogt (10) Patent No.: US 8,437,222 B2
(45) Date of Patent: May 7, 2013

(54) SYSTEM AND METHOD OF RANGE ESTIMATION

(75) Inventor: Mark A. Vogt, San Diego, CA (US)

(73) Assignee: Teledyne RD Instruments, Inc., Poway, CA (US)

( * ) Notice: Subject to any disclaimer, the term of this patent is extended or adjusted under 35 U.S.C. 154(b) by 0 days.

(21) Appl. No.: 13/076,168

(22) Filed: Mar. 30, 2011

(65) Prior Publication Data

US 2011/0182147 A1    Jul. 28, 2011

Related U.S. Application Data

(63) Continuation of application No. 12/191,196, filed on Aug. 13, 2008, now Pat. No. 7,924,653.

(51) Int. Cl.
*G01S 15/08* (2006.01)
(52) U.S. Cl.
USPC ............................................ 367/100; 367/99
(58) Field of Classification Search .................... 367/99, 367/100, 103
See application file for complete search history.

(56) References Cited

U.S. PATENT DOCUMENTS

| | | |
|---|---|---|
| 3,723,952 A | 3/1973 | Walsh |
| 5,122,990 A | 6/1992 | Deines et al. |
| 6,052,334 A | 4/2000 | Brumley et al. |
| 6,058,075 A | 5/2000 | Bourdelais |
| 6,282,151 B1 * | 8/2001 | Brumley et al. .............. 367/90 |

OTHER PUBLICATIONS

The International Search Report mailed on Oct. 21, 2009 for corresponding PCT Application No. PCT/US2009/051591.
Hummon et al. "A direct comparison of two RDI Shipboard ADCPs: A 75 kHz Ocean Surveyour and a 150-kHz Narrow Band." *Journal of Atmospheric and Oceanic Technology*. 20:872-888 (2003).

* cited by examiner

*Primary Examiner* — Ian Lobo
(74) *Attorney, Agent, or Firm* — Knobbe, Martens, Olson & Bear, LLP (57) ABSTRACT

A system and method of range estimation are disclosed. In one embodiment, the method comprises transmitting beams through a medium towards a surface, receiving reflected signals from the surface, and estimating range to the surfaced based on the reflected signals and an estimate of sidelobe coupling of the beams.

11 Claims, 8 Drawing Sheets

SYSTEM AND METHOD OF RANGE ESTIMATION

CROSS-REFERENCE TO RELATED APPLICATIONS

This application is a continuation of U.S. patent application Ser. No. 12/191,196, filed Aug. 13, 2008, which is hereby incorporated by reference in its entirety.

BACKGROUND

1. Field

This application generally relates to acoustic range estimation, and in particular to sonar range estimation using multi-beam devices.

2. Description of the Related Art

A current profiler is a type of sonar system that is used to remotely measure water velocity over varying ranges. Current profiles are used in freshwater environments such as rivers, lakes, and estuaries, as well as in saltwater environments such as the ocean, for studying the effects of current velocities. The measurement of accurate current velocities is important in such diverse fields as weather prediction, biological studies of nutrients, environmental studies of sewage dispersion, and commercial exploration for natural resources, including oil.

Typically, current profilers are used to measure current velocities in a vertical column of water for each depth "cell" of water up to a maximum range, thus producing a "profile" of water velocities. The general profiler system includes a transducer to generate pulses of sound (which when down-converted to human hearing frequencies sound like "pings") that backscatter as echoes from plankton, small particles, and small-scale inhomogeneities in the water. The received sound has a Doppler frequency shift proportionate to the relative velocity between the scatters and the transducer.

The physics for determining a single velocity vector component ($v_x$) from such a Doppler frequency shift may be concisely stated by the following equation:

$$v_x = \frac{c f_D}{2 f_T \cos\theta} \quad (1)$$

In equation (1), c is the velocity of sound in water, about 1500 meters/second. Thus, by knowing the transmitted sound frequency, $f_T$, and declination angle of the transmitter transducer, $\theta$, and measuring the received frequency from a single, narrowband pulse, the Doppler frequency shift, $f_D$, determines one velocity vector component. Relative velocity of the measured horizontal "slice", or depth cell, may be further determined by subtracting out a measurement of vessel earth reference velocity, $v_e$. Earth reference velocity can be measured by pinging the ocean bottom whenever it comes within sonar range or by a navigation system such as LORAN or GPS.

Commercial current profilers are typically configured as an assembly of four diverging transducers, spaced at 90° azimuth intervals from one another around the electronics housing. This transducer arrangement is known in the technology as the Janus configuration. A three-beam system permits measurements of three velocity components, $v_y$, and $v_z$ (sometimes identified respectively as u, v, w in oceanographic literature) under the assumption that currents are uniform in the plane perpendicular to the transducers mutual axis. However, four beams are often used for redundancy and reliability. The current profiler system may be attached to the hull of a vessel, remain on stationary buoys, or be moored to the ocean floor.

Of particular importance to the vessel-mounted current profiler is the accurate determination of vessel velocity. The earth reference water velocities can then be calculated by subtracting out the vessel velocity. As is well-known, the movement of the vessel with respect to the earth is based on establishing at least two fixed reference points over a period of time. In a current profiler, one common technique to find the bottom is to interleave a bottom range pulse with the current velocity pulses. The bottom range pulse is generally of a longer duration than other pulses so as to fully ensonify the bottom. The length of the pulse may be chosen according to the assumed maximum depth and the angle subtended by the transducer.

In some existing current profilers the decision-making for bottom detection has been based on a simple comparison between received signal amplitude and a threshold value. While performing reasonably well, these systems may produce "false bottoms" as a result of strong inhomogeneities or life layers, such as plankton or schooling fish, which offer alternative sources of acoustic reflection. Thus, it will be readily appreciated that false bottoms, located at ranges from the transducer that are less than the range to the actual bottom, can lead to inaccurate range and velocity measurements.

Accordingly, more accurate sonar systems to detect the bottom of a body of water are desired. In particular, a sonar system that minimizes the detection of false bottoms will improve the quality of vessel and water velocities. It would be a further improvement if the sonar system could compensate for signal losses due to water absorption and spreading.

SUMMARY OF THE CERTAIN INVENTIVE ASPECTS

One aspect of the invention is a method of estimating range to a surface of a body of water, the method comprising transmitting at least one acoustic signal through the body of water, receiving a plurality of signals reflected from the surface, and estimating a distance to the surface based on data indicative of the received signals and an estimate of sidelobe coupling.

Another aspect of the invention is a range estimation system relating to transmission and reception of acoustic signals in a fluid medium, comprising a sonar system having a plurality of transducers configured to generate respective acoustic beams and to receive echoes from the beams, and a signal processor configured to estimate a distance based on data indicative of the received echoes and an estimate of sidelobe coupling of a selected one of the beams with at least one other of the beams.

Another aspect of the invention is a computer-program product for use in a sonar system, the product comprising a computer-readable medium having stored thereon codes executable by at least one processor to receive data indicative of signals reflected from a surface of a body of water in response to at least one transmitted acoustic pulse, and estimate a distance to the surface based on the data indicative of the reflected signals and an estimate of sidelobe coupling.

DETAILED DESCRIPTION OF CERTAIN INVENTIVE EMBODIMENTS

Reference is now made to the drawings wherein like numerals refer to like parts throughout.

In other sonar systems including, for instance, depth sounders, bottom mapping sonars, sidescan sonars, speed logs and correlation logs, matched filtering techniques (or equivalent correlation techniques) have been used to minimize the number of false bottoms. Matched filtering is a technique that applies a signal to a linear filter so as to statistically determine the existence of a signal of interest. Prior approaches compare the output of the standard matched filter with a predetermined threshold value and thus they may still detect false bottoms. In addition, other systems generally do not account for the principal sources of signal loss in water.

Several sources of signal loss may produce errors whenever a sonar echo is compared with an absolute reference value or threshold. For example, unlike electronic emissions propagating through air, sound waves traveling in water are subject to water absorption losses due to thermal effects. Further, due to signal spreading (intuitively akin to the spreading ripples which emanate from a rock thrown into a pond), the strength of the transmitted signal is inversely proportional to the square of the range. Hence, these sources of signal loss will also affect any comparison of a filtered signal with a threshold value.

Sidelobe interference can cause bottom detection to be more difficult because bottom returns from other beams are mixed in with, or coupled with, the return from a beam oriented to receive a bottom return (e.g., the beam of interest for bottom detecting). Particularly, when a transducer is not perpendicular to the bottom, interfering returns may be at ranges other than the range of the beam of interest and thus may result in poor estimates being made by a detection filter. In applications, such as Doppler velocity logs, incorrect measurement of bottom range can result in incorrect velocity measurements.

In one embodiment, a method of range estimation comprises transmitting at least one acoustic signal through a body of water, receiving at least two reflected signals from a surface, generating data based on the reflected signals and an estimate of sidelobe coupling, and estimating the distance to the surface based on the generated data and sidelobe estimate. In particular, in one embodiment, the surface is a surface at the bottom of the body of water.

Figure 1:
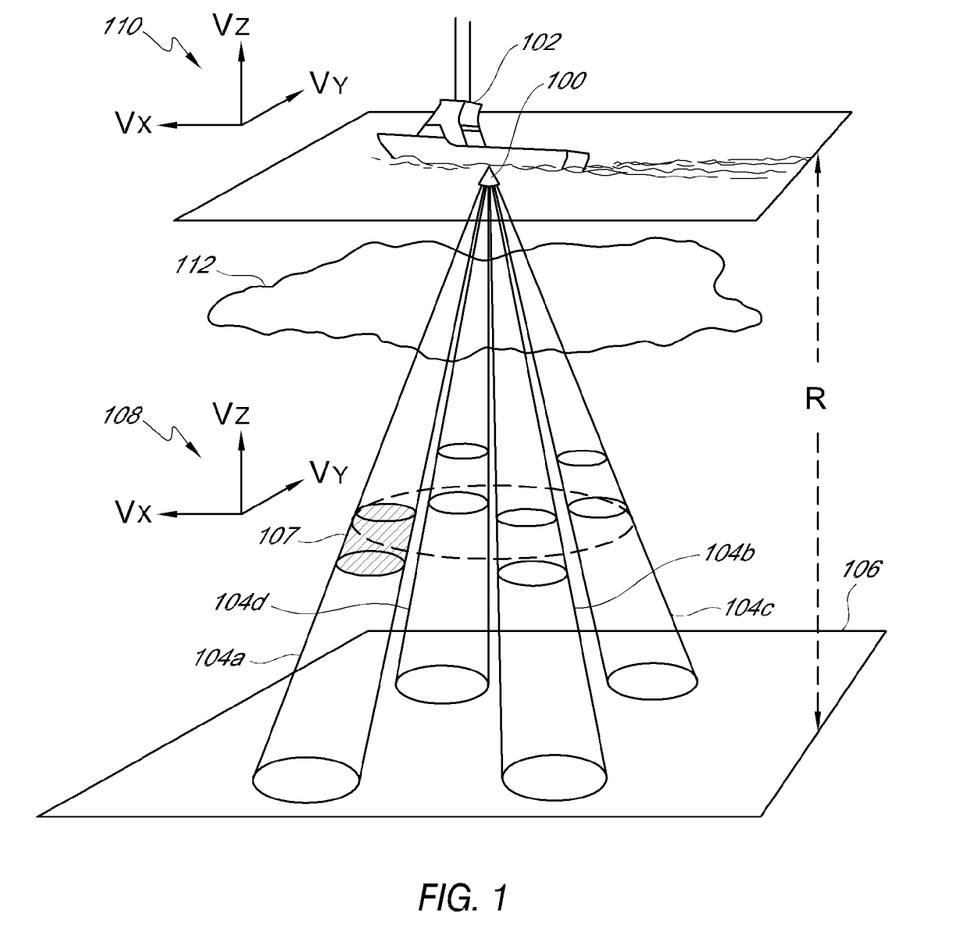
FIG. 1 is perspective view of a download-looking current profiler having a Janus configuration of transducers, wherein the current profiler is attached to the hull of vessel.

FIG. 1 illustrates a current profiler 100 which is attached to the hull of a moving vessel 102. The current profiler 100, as shown in FIG. 1, generates a set of acoustic beams 104a, 104b, 104c, 104d which emanate from one or more transducers. An exemplary current profiler is disclosed in U.S. Pat. No. 5,208,785, which is hereby incorporated by reference. In the illustrated embodiment, the current profiler 100 is downward-looking, that is, the acoustic beams 104 are directed in a generally vertical orientation towards an acoustically reflective surface such as the ocean bottom 106 and the beams 104 are in a Janus configuration. Each beam 104 "illuminates" a water column which can be decomposed into horizontal slices known as range, or depth, cells such as the cell indicated at 107. By suitable transmission of acoustic beams and reception of resulting echoes received from the cells, the echo data can be transformed into a Doppler frequency, a velocity along the beam 104, and then one or more orthogonal current velocity components such as those indicated at 108.

Since the vessel 102 is moving in the illustrated embodiment, the measured velocity of the range cell 107 is relative to the velocity of the vessel 102. Therefore, a bottom range pulse is periodically interleaved in the beams 104 to determine the orthogonal velocity components of the vessel such as those indicated at 110. The earth reference velocity of the range cell 107 is then obtained by subtracting the velocity of the vessel 102 from the measured vessel reference velocity of the range cell 107.

Although bottom tracking using a downward looking current profiler 100 is described herein, it is to be recognized that other uses may be made of the methods and systems described herein. For instance, embodiments may include, for example, an upward looking configuration to measure the movement of sheets of ice in one of the polar regions.

It is important to note that in measuring the range (R) between the vessel 102 and the bottom 106, a life layer 112 such as a layer of plankton or schooling fish may also reflect the transmitted pulse with a relatively high signal strength causing detection of a "false bottom." Also important to note is the possible presence of sidelobes in the received signals. When a signal, such as a bottom range pulse is transmitted in a particular beam oriented to detect the bottom, the reflected signal is most strongly received in the corresponding received beam, but also weakly received in the other received beams. When multiple signals are transmitted from each of the beams, the received signals from each beam may comprise a strong component corresponding to the reflected signal transmitted from the beam combined (coupled) with weaker components corresponding to reflected signals transmitted from the other beams. The weaker sidelobe components can constructively or destructively interfere with the strong, main component resulting in less accurate measurements.

Typically, the sidelobe components are, but not always, at least 20 dB weaker than the main component, however, this number can vary substantially with the configuration of the system. Typical piston transducers exhibit approximately 45 dB of sidelobe rejection, while a phased array transducers may exhibit from 30 dB to 33 dB of sidelobe rejection.

Figure 2:
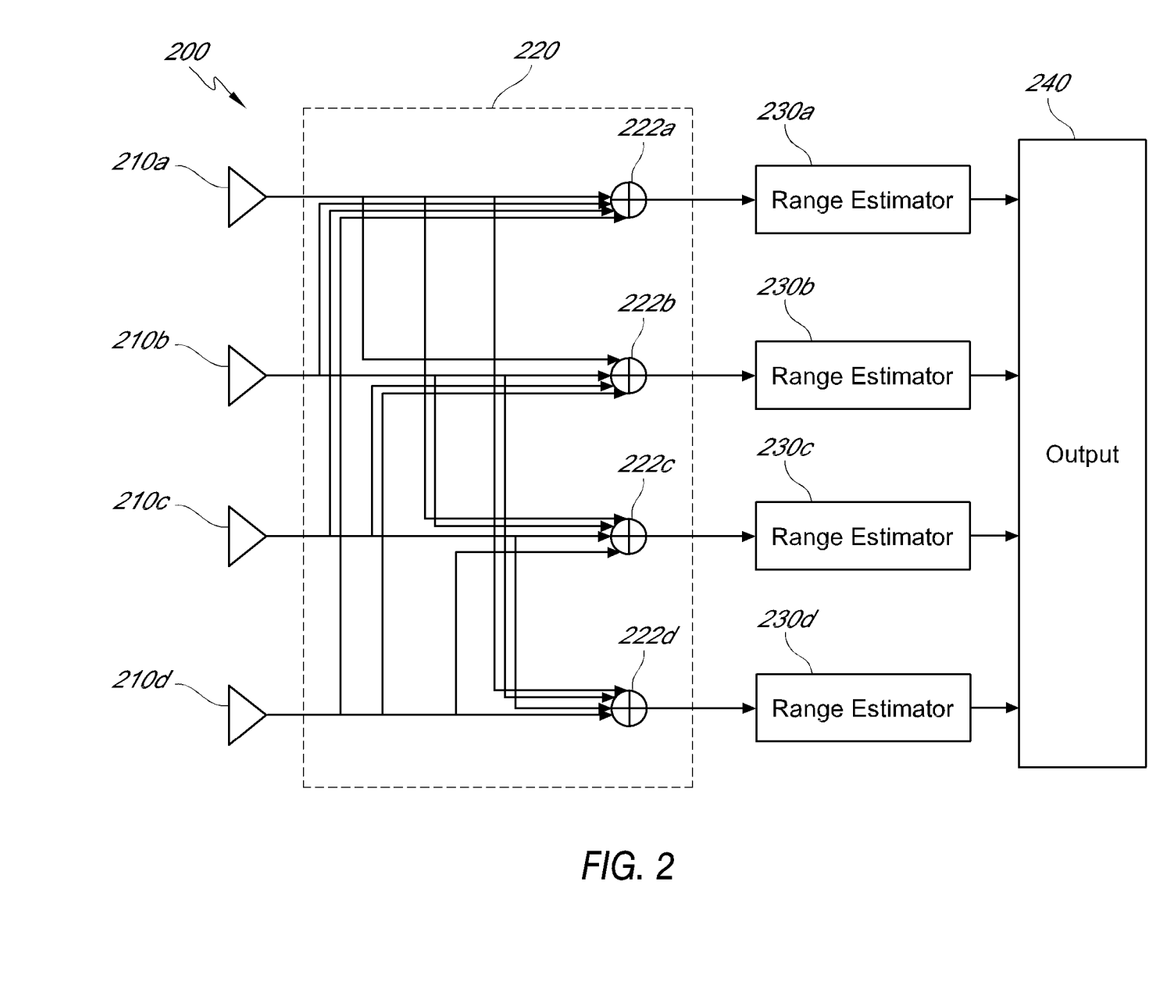
FIG. 2 is functional block diagram of a range estimation system.

FIG. 2 is functional block diagram of a range estimation system 200 designed to compensate for the coupling with sidelobes in the various beam measurements. In one embodiment, the system 200 is integrated with the current profiler 100. The range estimation system 200 comprises a number of transducers 210a, 210b, 210c, 210d, each corresponding to a particular beam. A side lobe compensation module 220 receives return data from the transducers 210 and provides compensated data to one or more range estimation modules 230. The transducers 210 generally transmit bursts of sound waves called pings, and/or receive waveforms such as echoes in response to the transmitted pings. In one embodiment, the received waveforms are fed into a sidelobe compensation module 220 which performs at least a linear transformation of the input waveforms to produce at least one output waveform. The sidelobe compensation module 220 may, for example, comprise a number of amplifiers incorporated into adders 222a, 222b, 222c, 222d in order to perform a linear transformation. The sidelobe compensation module 220 may be configured to perform other related functions, and therefore may include linear functional blocks such as delays and non-linear functional blocks such as a thresholding block. The one or more output waveforms are input into one or more range estimation modules 230a, 230b, 230c, 230d that produce an output indicative of the range, which is derived from the waveforms output from the sidelobe compensation module 220. The output may be displayed, printed, stored, transmitted, or otherwise communicated via an output module 240.

The sidelobe compensation module 220, the range estimation module(s) 230, the output module 240, and/or other illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in any suitable computer readable medium such as a volatile or non volatile memory such as a DRAM memory, flash memory, ROM memory, EPROM memory, EEPROM memory, registers, hard disk, a removable disk, a CD-ROM, or any other form of suitable storage medium known in the art. An exemplary storage medium is coupled to the processor such the processor can read information from, and write information to, the storage medium. In the alternative, the storage medium may be integral to the processor. The processor and the storage medium may reside in an ASIC or in any suitable commercially available chipset.

Figure 3:
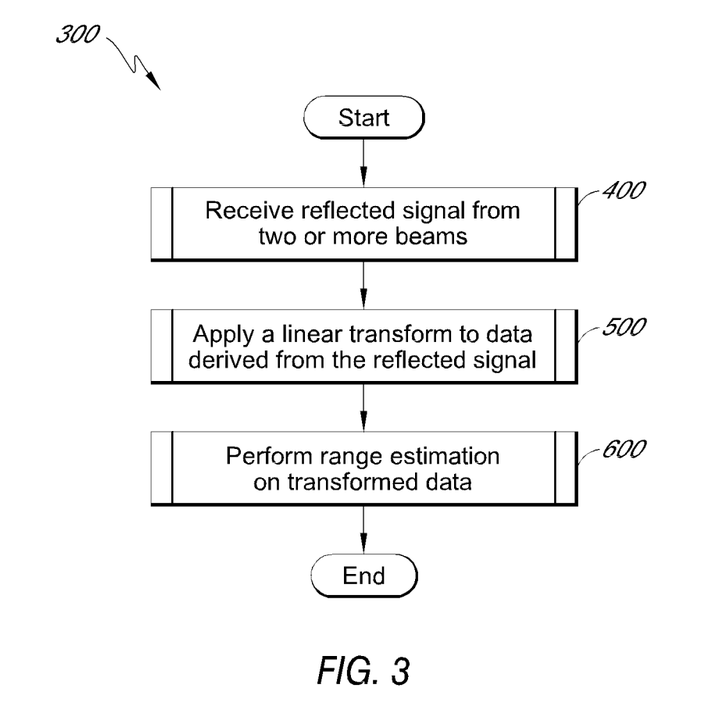
FIG. 3 is a flowchart illustrating a method of detecting a range.

FIG. 3 is a flowchart illustrating such a method of detecting a range. The method 300 begins, in block 400, in which the transducers 210 receive reflected signals from two or more beams. Next at a block 500, a processor such as the sidelobe compensation module 220 performs a linear transformation on data derived from the reflected signal. Moving to block 600, the range estimation modules 230 perform range estimation on the transformed data. Further details of each of the blocks 400, 500, and 600 is set forth below with reference to FIGS. 4, 5, and 6.

Figure 4:
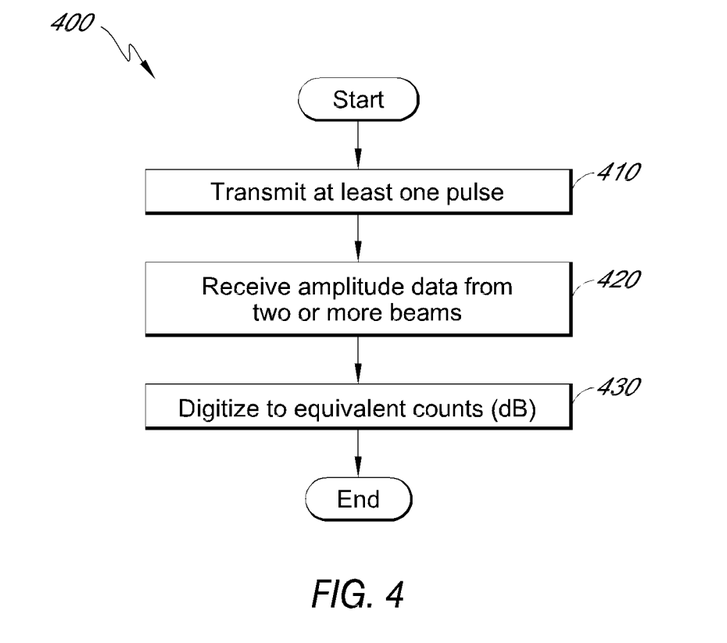
FIG. 4 is a flowchart illustrating a method of receiving a reflected signal.

FIG. 4 is a flowchart illustrating in more detail one embodiment of the block 400 of FIG. 3 of receiving a reflected signal. The method 400 begins, in block 410, by transmitting at least one pulse. In some embodiments, four pulses are simultaneously transmitted from four transducers in a Janus beam configuration. In block 420, the transducers 220 receive signals from two or more beams, which are then converted into amplitude data. In some embodiments, the amplitude data is received in four beams by the above-described four transducers in a Janus beam configuration. In other embodiments, a pulse is transmitted from one transducer and received on two transducers. The transducers involved in transmitting the pulse in block 410 are not necessarily the same transducers that receive amplitude data in block 420. In block 430, the amplitude data is digitized into equivalent dB counts. This may involve a logarithmic transformation and quantization. In other embodiments of the invention, the method 400 lacks blocks 410 and/or 430.

Figure 5:
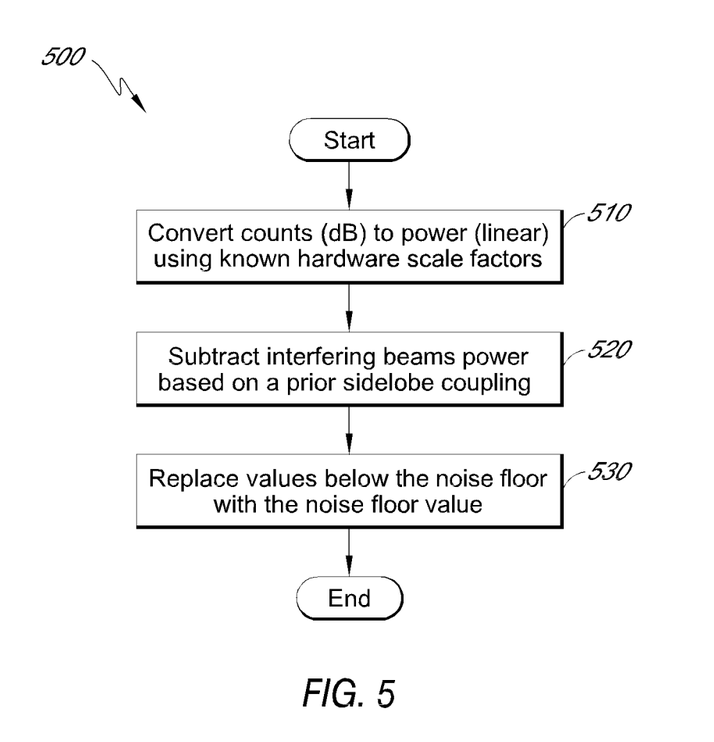
FIG. 5 is a flowchart illustrating a method of applying a linear transform.

FIG. 5 is a flowchart illustrating in more detail one embodiment of the block 500 of FIG. 3 of applying a linear transformation such as using the sidelobe compensation module 220. In general, a linear transformation of waveforms involves summing weighted versions of the waveforms to produce one or more transformed waveforms. This can be performed in software executed by a processor, or electronic hardware, using well-know matrix-vector multiplication methods. The method 500 illustrated in FIG. 5 beings, in block 510, by converting counts (logarithmic) to power (linear) using known hardware scale factors. In block 520, interfering beams' power is subtracted based on an estimate of sidelobe coupling between the beams. Subtracting the interfering beams power is a form of linear transformation of the beams. In one embodiment, the estimate of sidelobe coupling comprises an a priori estimate of sidelobe coupling. The a priori estimate of sidelobe coupling may be measured in situ or pre-programmed into the system. For example, a pulse may be sent from a single beam at a time the other beams are kept silent. The reflected signal should be strongest on the beam which sent the signal, but the other beams will record weaker versions of the reflected signal corresponding to the sidelobe coupling. This measurement could be performed in a round-robin fashion to measure the full sidelobe coupling matrix. In other embodiments, it is assumed that certain sidelobe coupling factors are identical based on the geometry of the system. For example, in a Janus beam configuration, it may be assumed that the coupling between a beam and the two closest beams is identical. In other embodiments, the sidelobe coupling is not known a priori, but based, at least in part, on the reflected signal. For example, principal component analysis (PCA), or independent component analysis (ICA), could be used to determine the sidelobe coupling based on the reflected signal. The use of PCA or ICA could directly perform the linear transformation without determining a sidelobe coupling.

In some circumstances, such as when the sidelobe coupling is inaccurate, the linear transformation can result in values for the transformed waveform which are physically unlikely. As mentioned, a received waveform may comprise a main component and sidelobe components. Additionally, the received waveform may comprise a noise component, which is generally of constant power. A linear transformation to remove the sidelobe components should not result in a waveform lacking the noise component. Thus, any values less than the constant power of the noise, the so-called noise floor, such be replaced with the noise floor or some other appropriate value, which is described in block 530.

Figure 6:
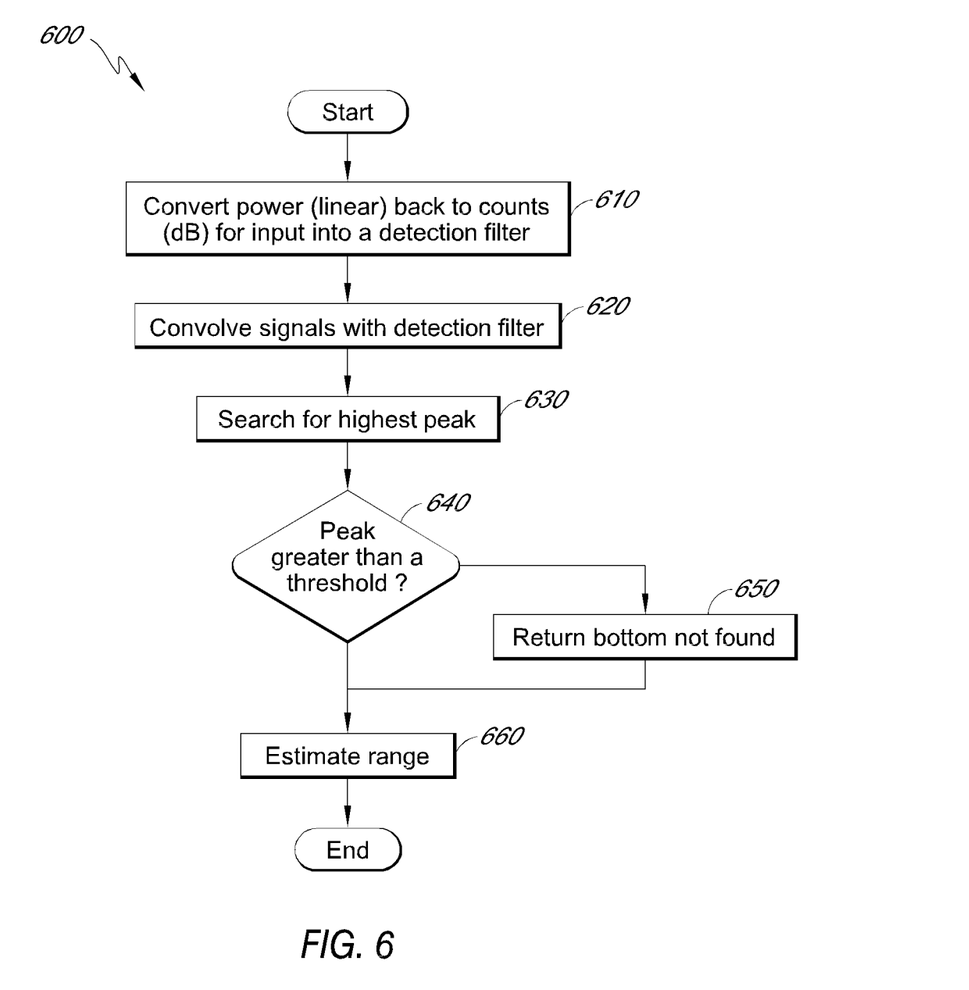
FIG. 6 is a flowchart illustrating a method of bottom detection.

FIG. 5 is a flowchart illustrating in more detail one embodiment of the block 600 of estimating range such as using one or more of the range estimates 230. In block 610, the method begins by converting power (linear) back to counts (logarithmic) for input into a detection filter. In block 620, the transformed waveforms are convolved with a detection filter. The detection filter may be, in some embodiments, a matched filter, such as a filter matched to transmitted ping. The detection filter may also be a modified version of the transmitted ping, such as a version of the ping of slightly longer duration, or a derivate of the transmitted ping. One embodiment of a suitable detection filter is described in U.S. Pat. No. 5,112,990, entitled "Bottom Tracking System," which is hereby incorporated by reference in its entirety. In block 630, a search is performed for the highest peak of the result of convolving the transformed waveform with the detection filter. In block 640, the value of this peak is compared to a threshold. If the value of this peak is below the threshold, the method 600 moves to block 650 where it is indicated that the bottom was not found. If the value of this peak is above a threshold, the bottom has been detected and the method 600 moves to block 660 where the range is estimated. The range may be estimated, for example, based on the position of the peak. In general, the travel time of the ping from the transducer to the bottom back to the transducer, the declination angle of the transmitter/receiver, the speed of sound in the medium (corrected for refraction), etc. may be used to estimate the range from the transducer to the bottom.

Figure 7A:
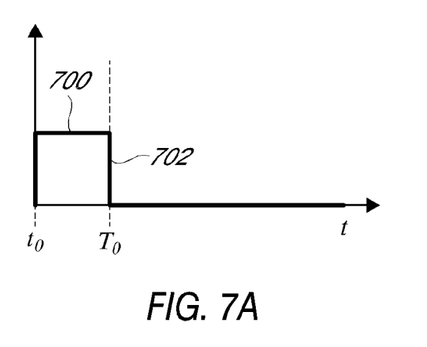
FIGS. 7A and 7B are diagrams illustrating the transmitted waveforms from two beams.
Figure 7B:
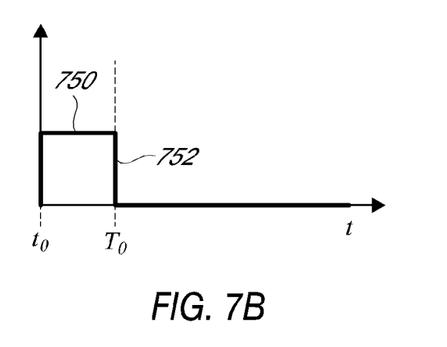

An embodiment is now described with respect to exemplary waveforms generated using, for example, the system 200. The waveforms shown in FIGS. 7-10 are greatly exaggerated for instructive purposes, and are not to scale. Each waveform is a plot of power versus time in a logarithmic scale. FIGS. 7A and 7B are diagrams illustrating the transmitted waveforms from two interfering beams. The waveform 700 transmitted by Beam 1 comprises a pulse 702 of duration $T_0$ seconds. The waveform 750 transmitted by Beam 2 comprises a similar pulse 750 of the same duration. Each waveform 700,750 may be transmitted in slightly different directions, such as in the case in two beams in a Janus configuration. After propagating through a medium, such as a body of water, and a beam is reflected off a surface, such as a bottom surface of an ocean or other body of water, a waveform is received by each beam.

Figure 8A:
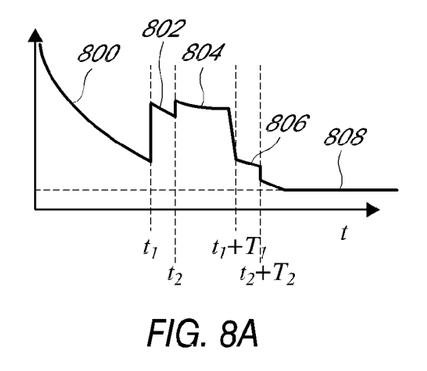
FIGS. 8A and 8B are diagrams illustrating the received waveforms after the transmitting beams of FIGS. 7A and 7B have reflected off a surface.
Figure 8B:
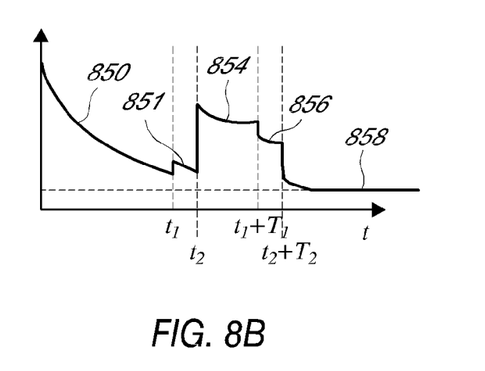

FIGS. 8A and 8B are diagrams illustrating the received waveforms after the transmitting beams of FIGS. 7A and 7B have reflected off a surface in a body of water. The waveform 800 received on Beam 1 comprises a main component and a sidelobe component from Beam 2, and shows a general exponential decay due to the lossy propagation in the body of water. The main component is first received at time $t_1$, and is of duration $T_1$. The sidelobe component is first received at time $t_2$ and is of duration $T_2$. Thus, the received waveform between $t_1$ and $t_2$ 802 consists only of the main component. The received waveform between $t_2$ and $t_1+T_1$ 804 consists of both the main component and the sidelobe component. Between $t_1+T_1$ and $t_2+T_2$ 806, the waveform consists on only the sidelobe component. After a certain amount of time, the received waveform has decayed into the noise floor 808. Similarly, the waveform 850 received on Beam 2 comprises both a main component and a sidelobe component. Between $t_1$ and $t_2$ 852, only the sidelobe component from Beam 1 is received. Between $t_2$ and $t_1+T_1$ 854, both components interfere (in this case, constructively). Between $t_1+T_1$ and $t_2+T_2$ 856, the waveform consists on only the main component. Eventually, the received waveform decays into the noise floor 858.

Figure 9A:
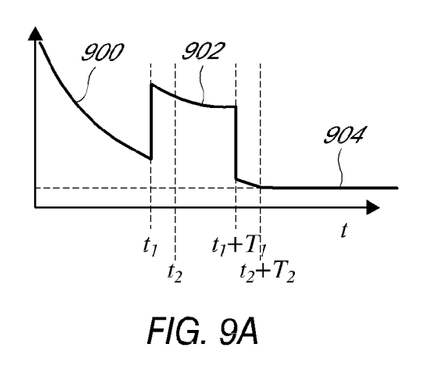
FIGS. 9A and 9B are diagrams illustrating waveforms based on linear transforms of the waveforms of FIGS. 8A and 8B.
Figure 9B:
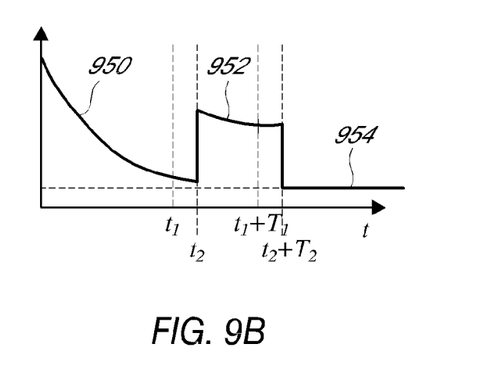

As discussed above with reference to block 300 of FIG. 3, a linear transformation is performed on the waveforms such as illustrated by traces 800,850 of FIGS. 8A and 8B to generate the waveforms such as illustrated by traces 900,950 of FIGS. 9A and 9B. Mathematically, the received waveforms 800,850, denoted $y_1$ and $y_2$ respectively can be expressed by equations 2 and 3:

$$y_1 = A + \alpha B, \qquad (2)$$

$$y_2 = \alpha A + B, \qquad (3)$$

where A and B are the returns due to the transmitted waveforms 700,750 of Beam 1 and Beam 2, respectively, and $\alpha$ is a sidelobe coupling. Transformed waveforms, A and B can be expressed respectively, by weighting and adding $y_1$ and $y_2$ appropriately, as shown below in equations 4 and 5.

$$z_1 = A = \frac{1}{1-\alpha^2}y_1 + \frac{-\alpha}{1-\alpha^2}y_2 \qquad (4)$$

$$z_2 = B = \frac{-\alpha}{1-\alpha^2}y_1 + \frac{1}{1-\alpha^2}y_2 \qquad (5)$$

Equations 2 and 3 shown above neglect the noise floor.

Figure 10A:
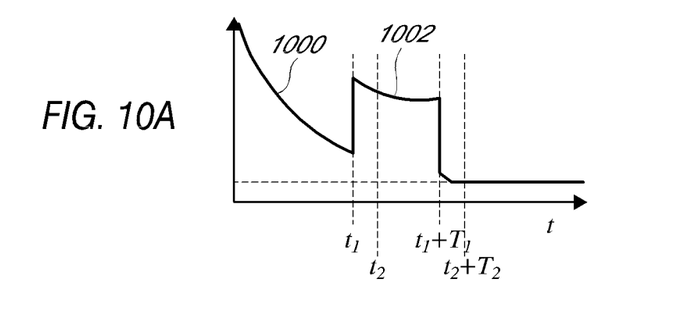
FIGS. 10A-10D are diagrams of waveforms based on various methods of linear transformation.

FIGS. 10A-10D are diagrams illustrated waveforms based on various linear transformations with noise considered. The waveform 1000 shown in FIG. 10A is a transformed waveform after an ideal transformation showing only the return due to the transmitted waveform 700 of Beam 1. In particular, such a result is given by the use of the constants shown in Equations 4 and 5, assuming the sidelobe coupling given in Equations 2 and 3 is accurate.

Figure 10B:
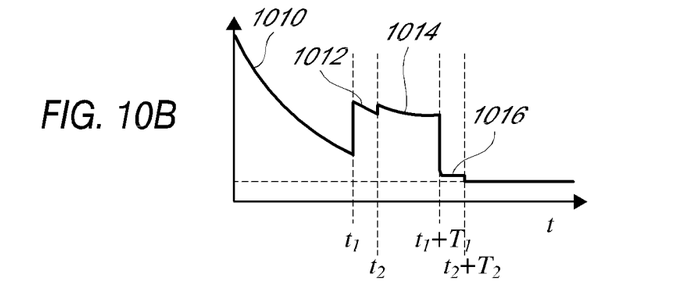

FIG. 10B illustrates a transformed waveform 1010 that may result if the estimate of sidelobe coupling or the transformation is inaccurate. In particular, the waveform 1010 is the result of inaccurately transforming the waveforms 800, 850 shown in FIGS. 8A and 8B. Between times $t_1$ and $t_2$ 1012, only the main component is present. Between times $t_2$ and $t_1+T_1$ 1014, both the main component and the sidelobe component is present. This portion of the waveform 1014 differs from the portion of the waveform 804 shown in FIG. 8A in that the sidelobe component is somewhat reduced, but not entirely removed as in the waveforms of FIG. 9A or 10A. Similarly, between times $t_1+T_1$ and $t_2+T_2$ 1016, the waveform consists on only the sidelobe component, which has been reduced but not eliminated.

Figure 10C:
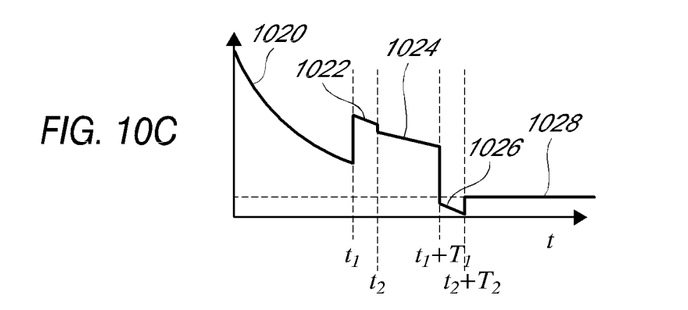
Figure 10D:
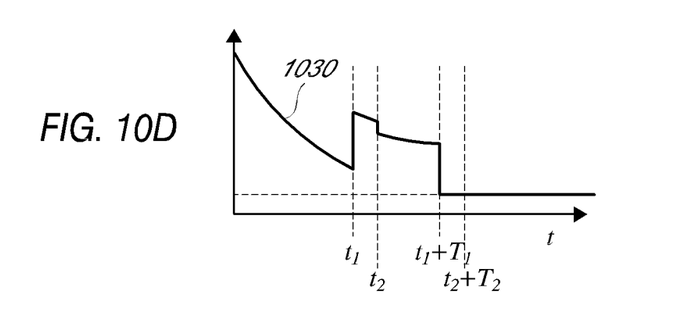

FIG. 10C illustrates another transformed waveform 1020 that may result if the estimated sidelobe coupling or the transformation is inaccurate. As with the waveform 1010 shown in FIG. 10B, the waveform 1020 shown in FIG. 10C is the result of inaccurately transforming the waveforms 800, 850 shown in FIGS. 8A and 8B. Between times $t_1$ and $t_2$ 1022, only the main component is present. Between times $t_2$ and $t_1+T_1$ 1024, both the main component and the sidelobe component is present. This portion of the waveform 1024 differs from the portion of the waveform 804 shown in FIG. 8A in that the sidelobe component is so reduced as to become a negative component, instead of being a zero component as in the waveforms of FIG. 9A or 10A. Similarly, between times $t_1+T_1$ and $t_2+T_2$ 1026, the waveform consists on only the sidelobe component, which has been so reduced as to be a negative component. The sidelobe component has been so reduced as to be below the noise floor 1028. As it is physically unlikely that a proper transformation would result in values below the noise floor, such values may be replaced with the noise floor, as shown in FIG. 10D. The waveform 1030 shown in FIG. 10D is the result of overcompensating for sidelobe interference and replacing values below the noise floor with the noise floor.

As can be seen in the FIGS. 10A, 10B, and 10C, even slightly inaccurate estimates of sidelobe coupling or transformations such as provided by embodiments described herein can have beneficial results, as the undercompensated and overcompensated (with or without noise floor replacement) transformed waveforms are closer to the ideal waveform than the received waveforms without transformation.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A range estimation system relating to transmission and reception of acoustic signals in a fluid medium, comprising:
a sonar system having a plurality of transducers configured to generate respective acoustic beams and to receive echoes from the beams; and
a signal processor configured to estimate a distance based on data indicative of the received echoes and an estimate of sidelobe coupling of a selected one of the beams with at least one other of the beams,
wherein the signal processor is configured to process the data indicative of the received echoes by subtracting a power associated with the at least one of the other beams from a power associated with the selected beam based on the estimate of sidelobe coupling, and estimate the distance based on the processed data.

2. The system of claim 1, wherein the system is embodied in an acoustic Doppler current profiler.

3. The system of claim 1, wherein the selected beam is oriented toward a bottom surface of the body of water.

4. The system of claim 1, wherein the signal processor comprises at least one of a processor and a digital signal processor.

5. The system of claim 1, wherein the estimate of sidelobe coupling comprises an a priori estimate of sidelobe coupling.

6. The system of claim 1, wherein the transducers comprise a Janus configuration.

7. A range estimation system relating to transmission and reception of acoustic signals in a fluid medium, comprising:
a sonar system having a plurality of transducers configured to generate respective acoustic beams and to receive echoes from the beams; and
a signal processor configured to:
generate amplitude data indicative of received echoes of a selected one of the acoustic beams generated by the plurality of transducers;
convert the amplitude data to power data;
subtract an estimate of sidelobe coupling between the selected beam and other beams of the acoustic beams generated by the plurality of transducers from the power data to generate transformed power data;
convert the transformed power data to transformed amplitude data; and
estimate a distance based on the converted, transformed, data.

8. A computer-program product for use in a sonar system, the product comprising:
a computer-readable storage medium having stored thereon codes executable by at least one processor to:
receive data indicative of signals reflected from a surface of a body of water in response to at least one transmitted acoustic pulse;
generate amplitude data indicative of the reflected signals from the at least one transmitted acoustic pulse;
convert the amplitude data to power data;
subtract an estimate of sidelobe coupling from the power data to generate transformed power data;
convert the transformed power data to transformed amplitude data; and
estimate a distance to the surface based on the transformed amplitude data.

9. A range estimation system relating to transmission and reception of acoustic signals in a fluid medium, comprising:
a sonar system having a plurality of transducers configured to generate respective acoustic beams and to receive echoes from the beams; and
a signal processor configured to estimate a distance based on data indicative of the received echoes and an estimate of sidelobe coupling of a selected one of the beams with at least one other of the beams, the signal processor further configured to estimate the distance based on convolving data indicative of the received echoes of the beams with a detection filter to produce a convolved signal, locating the highest peak on the convolved signal, and comparing the highest peak to a threshold.

10. The system of claim 9, wherein the signal processor is configured to process the data indicative of the received echoes by subtracting a power associated with the at least one of the other beams from a power associated with the selected beam based on the estimate of sidelobe coupling, and estimate the distance based on the processed data.

11. A range estimation system relating to transmission and reception of acoustic signals in a fluid medium, comprising:
a sonar system having a plurality of transducers configured to generate respective acoustic beams and to receive echoes from the beams; and
a signal processor configured to estimate a distance based on data indicative of the received echoes and an estimate of sidelobe coupling of a selected one of the beams with at least one other of the beams, the signal processor further configured to estimate the distance based on replacing values of data indicative of amplitude of the received echoes that are below a threshold with a non-zero specified value.

* * * * *